Patented May 8, 1928.

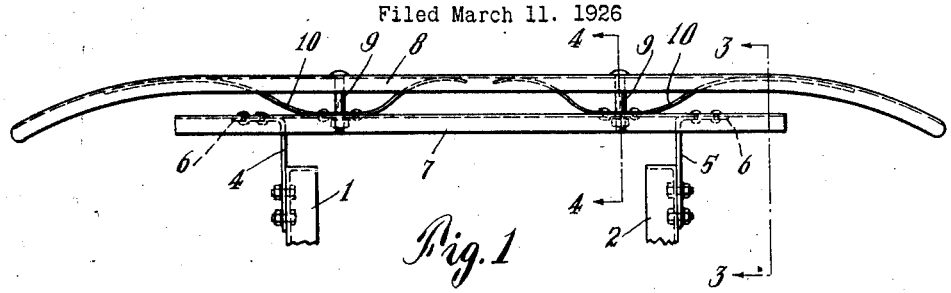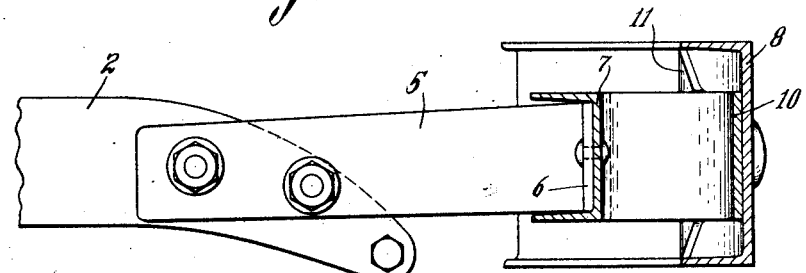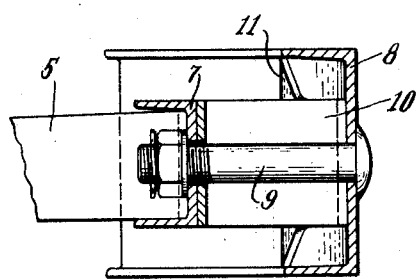

1,668,811

UNITED STATES PATENT OFFICE.

JAMES R. JONES, OF UTICA, NEW YORK, ASSIGNOR TO THE BOSSERT CORPORATION, OF UTICA, NEW YORK, A CORPORATION OF NEW YORK.

AUTOMOBILE BUMPER.

Application filed March 11, 1926. Serial No. 94,021.

The present invention relates to bumpers for automobiles, and has for its object to furnish an improved bumper for this purpose which combines maximum capacity for yieldingly resisted inward motion, when encountering an obstruction, with minimum bulk, has full freedom for the desired character of buffer motion, and is supported in a way to minimize undesired looseness and rattling. The precise nature of the improvements of which the invention consists appears from the following description in connection with the drawings.

In the drawings,—

Fig. 1 is a plan view of a bumper and its supporting brackets in the relations which these members bear to the chassis of an automobile;

Fig. 2 is a rear elevation of the bumper, the brackets being shown in section;

Fig. 3 is a sectional elevation taken on line 3—3 of Fig. 1 and represented on an enlarged scale;

Fig. 4 is a section taken on line 4—4 of Fig. 1, also shown on an enlarged scale.

Like reference characters designate the same parts in all the figures wherever they occur.

In Fig. 1 the ends of the side rails of an automobile chassis are shown in a fragmentary way at 1 and 2. One of said rails and the adjacent connected end of the spring 3 are shown in Fig. 3. Brackets 4 and 5 are secured to such rails near the ends thereof and extend beyond such ends, terminating in outturned lugs 6, to which the bumper is secured.

The bumper consists of an inner or base bar 7, an outer or buffer bar 8, (the bumper proper), connecting and guiding bolts or pins 9, 9, and buffer springs 10, 10 interposed between these bars. The base bar is preferably a steel member of channel section, so made to combine strength with lightness, and is preferably so placed that its channeled side is turned toward the automobile body and receives the brackets, the flanges of which are riveted or bolted to the intermediate web of this bar. The buffer bar or buffer proper is preferably made of the same material and construction, but is longer than the base bar, extending at both ends beyond the ends of the latter, and is curved back at the ends; and is enough wider than the base bar to admit the latter between its flanges. The guide bolts pass through holes in the two bars and each has a head on one end and a nut on the other to limit separation of the bars, but they are freely movable with respect to at least one of the bars so as to permit inward movement of the buffer bar when striking an obstacle. While other means than the bolts 9 may be used for connecting the bars together and limiting their separation, I prefer bolts as being the simplest and most effective in this combination.

The springs 10, 10 are of suitable ribbon or leaf spring stock secured by rivets or other suitable means to the base bar. There are two such springs, each of which is thus secured to the base bar at or near the points where the guide bolts are engaged with the latter. The springs are given a bowed shape, substantially as shown in Fig. 1, and both end portions engage the buffer bar between the flanges of the latter, while an intermediate portion is secured to the base bar. The outer extremity, at least, of each spring is given a width such that it will fit closely between the flanges of the buffer bar, as shown at 11 in Figs. 2, 3 and 4, in order to hold and maintain the buffer bar at such a height, and in such alinement, with respect to the base bar, that when the buffer bar is forced inward to the limit of motion, its flanges will pass over and embrace the base bar. This function of the springs in supporting the buffer bar is an important one, inasmuch as the guide bolts 9, being free in both bars, are not relied on to support the buffer bar; but, on the other hand, the springs prevent the buffer bar from sagging down and from binding or cramping on the guide bolts. The inner extremities of the springs also, or the whole or any other part of the length of the springs, may be made of the same width for the same purpose, if desired; although in these drawings only the outer extremities are made so wide, and all other parts of the springs are narrower.

By virtue of the construction and relative proportions of the several parts above described, it follows that when the bumper strikes an obstruction the outer bar is able to yield to the full limit of the space between the base bar and the web of the buffer bar, its flanges passing in a telescopic manner over the base bar. The springs of course, may be made to oppose as great resistance as desired to such movement of the outer bar, and may be designed to oppose increasing resistance to continued movement of this character. Thus provision is made for a sufficient movement of the outer bar to absorb shocks in striking an obstruction of any sort, while making the bumper as a whole of minimum width consistent with the necessary strength and capacity for yielding movement, and such shocks are absorbed without causing distortion of any part of bumper except the springs, which are intended to be distorted and are capable of a wide range of distortion within the elastic limit. The springs, moreover, are of a simple character and support the outer bar, relieving the guide bolts of any supporting function, and holding the outer bar in such a way as to prevent objectionable rattle and noise.

What I claim and desire to secure by Letters Patent is:

1. An automobile bumper comprising a base bar, a buffer bar, said buffer bar being of channel section and having a width enabling its flanges to embrace the base bar, and springs of the leaf spring type interposed between said bars, said springs being secured to the outer side of the base bar and extending at their ends into the space between the flanges of the outer bar free from positive connection with, and supporting, the latter.

2. An automobile bumper comprising a base bar, a buffer bar, said buffer bar being of channel section and having a width enabling its flanges to embrace the base bar, and springs of the leaf spring type interposed between said bars, said springs being secured to the outer side of the base bar and extending at their ends into the space between the flanges of the outer bar, said springs also being, in part at least, of a width substantially equal to the space between the flanges of the outer bar.

3. An automobile bumper comprising a base bar, a bowed spring secured at a point between its ends to the base bar and inclined outwardly therefrom at its ends, a buffer bar engaged with and supported by the outer ends of said spring, but free from positive connection therewith, and separation limiting means between said bars retaining the buffer bar against the ends of said spring.

4. An automobile bumper comprising a base bar, a bowed spring secured at a point between its ends to the base bar and bowed outwardly therefrom at its ends, a buffer bar engaged with and supported by the outer ends of said spring, and separation limiting means between said bars holding the buffer bar against the ends of said spring, said buffer bar having an upper flange which rests on the ends of the spring.

5. An automobile bumper comprising a base bar, a bowed spring secured at a point between its ends to the base bar and bowed outwardly therefrom at its ends, a buffer bar engaged with and supported by the outer ends of said spring, and separation limiting means between said bars holding the buffer bar against the ends of said spring, said buffer bar being of channel section with its flanges directed toward the base bar and embracing the ends of the spring, the distance between said flanges being greater than the width of the base bar, and the ends of the spring underlying the upper flange and supporting the same in such a position that when the buffer bar is forced back by an obstruction its flanges will embrace the base bar.

6. An automobile bumper comprising a base bar, brackets for attaching said bar to the frame of an automobile, bowed leaf springs secured at their intermediate parts to said base bar and extending at their ends outwardly from the base bar, in inclined relation thereto, and in the opposite direction from said brackets, a buffer bar having an upper flange directed toward the base bar, engaging and supported by the outer ends of said springs at a height enabling said flange to pass over the base bar when the buffer bar is pressed toward the base bar, and separation limiting means between the base bar and buffer bar arranged to retain the latter in connection with said springs.

7. An automobile bumper comprising a base bar, brackets for attaching said bar to the frame of an automobile, bowed leaf springs secured at their intermediate parts to said base bar and extending at their ends outwardly from the base bar, in inclined relation thereto, and in the opposite direction from said brackets, a buffer bar having an uper flange directed toward the base bar, engaging and supported by the outer ends of said springs at a height enabling said flange to pass over the base bar when the buffer bar is pressed toward the base bar, and separation limiting means between the base bar and buffer bar arranged to retain the latter in connection with said springs; said springs having at both ends free sliding engagement with the buffer bar and being otherwise free from connection therewith, and the separation limiting means being bolts having stop abutments and passing loosely through one of the bars, the weight of the buffer bar being supported wholly by the springs.

In testimony whereof I have affixed my signature.

JAMES R. JONES.